(12) United States Patent
Noyes (10) Patent No.: US 9,783,416 B2
(45) Date of Patent: Oct. 10, 2017

(54) METHODS OF PRODUCING HYDROGEN AND SOLID CARBON

(71) Applicant: Seerstone LLC, Provo, UT (US)

(72) Inventor: Dallas B. Noyes, Provo, UT (US)

(73) Assignee: Seerstone LLC, Provo, UT (US)

( * ) Notice: Subject to any disclaimer, the term of this patent is extended or adjusted under 35 U.S.C. 154(b) by 0 days.

(21) Appl. No.: 14/775,946

(22) PCT Filed: Mar. 12, 2014

(86) PCT No.: PCT/US2014/024619
§ 371 (c)(1),
(2) Date: Sep. 14, 2015

(87) PCT Pub. No.: WO2014/150944
PCT Pub. Date: Sep. 25, 2014

(65) Prior Publication Data
US 2016/0016794 A1    Jan. 21, 2016

Related U.S. Application Data (60) Provisional application No. 61/794,278, filed on Mar. 15, 2013.

(51) Int. Cl.
*C01B 3/40* (2006.01)
*C01B 31/02* (2006.01)
*C01B 3/38* (2006.01)

(52) U.S. Cl.
CPC .................. *C01B 3/40* (2013.01); *C01B 3/38* (2013.01); *C01B 31/02* (2013.01);
(Continued)

(58) Field of Classification Search
CPC ...................................................... C01B 3/40
See application file for complete search history.

(56) References Cited

U.S. PATENT DOCUMENTS 1,478,730 A    12/1923    Brownlee et al.
1,735,925 A    11/1929    Jaeger
(Continued)

FOREIGN PATENT DOCUMENTS

JP    2000072981 A    3/2000
JP    2002100787 A    4/2002
(Continued)

OTHER PUBLICATIONS

Abatzoglou, Nicolas et al., "The use of catalytic reforming reactions for C02 sequestration as carbon nanotubes," Proceedings of the 2006 IASME/WSEAS International Conference on Energy & Environmental Systems, Chalkida, Greece, May 8-10, 2006 (pp. 21-26) (available at: http://www.wseas.us/e-library/conferences/2006evia/papers/516-19 3.pdf).
(Continued)

*Primary Examiner* — Douglas B Call
(74) *Attorney, Agent, or Firm* — TraskBritt, P.C.

(57) ABSTRACT

A method for producing hydrogen, includes heating a process feed gas stream, flowing the process feed gas stream into a first reaction zone, flowing the intermediate gas stream into a second reaction zone, removing the solid carbon product from the second reaction zone, removing the tail gas stream from the second reaction zone, and removing hydrogen from the tail gas stream. The process gas stream includes methane and steam. The first reaction zone contains a first catalyst, and at least a portion of the process feed gas stream is converted into an intermediate gas stream in the first reaction zone. The second reaction zone contains a second catalyst, and at least a portion of the intermediate gas stream is converted into a tail gas stream and a solid carbon product in the second reaction zone.

19 Claims, 2 Drawing Sheets

(52) U.S. Cl.
CPC .............. C01B 2203/0233 (2013.01);
C01B 2203/047 (2013.01); C01B 2203/0435
(2013.01); C01B 2203/0811 (2013.01); C01B
2203/0833 (2013.01); C01B 2203/1047
(2013.01); C01B 2203/1058 (2013.01); C01B
2203/1217 (2013.01); C01B 2203/1241
(2013.01); C01B 2203/1258 (2013.01); C01B
2203/148 (2013.01)

(56) References Cited

U.S. PATENT DOCUMENTS

| | | | |
|---|---|---|---|
| 1,964,744 | A | 7/1934 | Odell |
| 2,429,980 | A | 11/1947 | Allinson |
| 2,440,424 | A | 4/1948 | Wiegand et al. |
| 2,796,331 | A | 6/1957 | Kauffman et al. |
| 3,172,774 | A | 3/1965 | Diefendorf |
| 3,378,345 | A | 4/1968 | Bourdeau et al. |
| 3,634,999 | A | 1/1972 | Howard et al. |
| 4,126,000 | A | 11/1978 | Funk |
| 4,602,477 | A | 7/1986 | Lucadamo et al. |
| 4,663,230 | A | 5/1987 | Tennent |
| 4,710,483 | A | 12/1987 | Burk et al. |
| 4,727,207 | A | 2/1988 | Paparizos et al. |
| 5,149,584 | A | 9/1992 | Baker et al. |
| 5,260,043 | A | 11/1993 | Li et al. |
| 5,413,866 | A | 5/1995 | Baker et al. |
| 5,456,897 | A | 10/1995 | Moy et al. |
| 5,457,343 | A | 10/1995 | Ajayan et al. |
| 5,531,424 | A | 7/1996 | Whipp |
| 5,569,635 | A | 10/1996 | Moy et al. |
| 5,572,544 | A | 11/1996 | Mathur et al. |
| 5,578,543 | A | 11/1996 | Tennent et al. |
| 5,589,152 | A | 12/1996 | Tennent et al. |
| 5,641,466 | A | 6/1997 | Ebbesen et al. |
| 5,648,056 | A | 7/1997 | Tanaka |
| 5,650,370 | A | 7/1997 | Tennent et al. |
| 5,691,054 | A | 11/1997 | Tennent et al. |
| 5,707,916 | A | 1/1998 | Snyder et al. |
| 5,726,116 | A | 3/1998 | Moy et al. |
| 5,747,161 | A | 5/1998 | Iijima |
| 5,780,101 | A | 7/1998 | Nolan et al. |
| 5,877,110 | A | 3/1999 | Snyder et al. |
| 5,965,267 | A | 10/1999 | Nolan et al. |
| 5,997,832 | A | 12/1999 | Lieber et al. |
| 6,099,965 | A | 8/2000 | Tennent et al. |
| 6,159,892 | A | 12/2000 | Moy et al. |
| 6,183,714 | B1 | 2/2001 | Smalley et al. |
| 6,203,814 | B1 | 3/2001 | Fisher et al. |
| 6,221,330 | B1 | 4/2001 | Moy et al. |
| 6,232,706 | B1 | 5/2001 | Dai et al. |
| 6,239,057 | B1 | 5/2001 | Ichikawa et al. |
| 6,261,532 | B1 | 7/2001 | Ono |
| 6,262,129 | B1 | 7/2001 | Murray et al. |
| 6,294,144 | B1 | 9/2001 | Moy et al. |
| 6,333,016 | B1 | 12/2001 | Resasco et al. |
| 6,346,189 | B1 | 2/2002 | Dai et al. |
| 6,361,861 | B2 | 3/2002 | Gao |
| 6,375,917 | B1 | 4/2002 | Mandeville et al. |
| 6,413,487 | B1 | 7/2002 | Resasco et al. |
| 6,423,288 | B2 | 7/2002 | Mandeville et al. |
| 6,426,442 | B1 | 7/2002 | Ichikawa et al. |
| 6,465,813 | B2 | 10/2002 | Ihm |
| 6,518,218 | B1 | 2/2003 | Sun et al. |
| 6,596,101 | B2 | 7/2003 | Weihs et al. |
| 6,645,455 | B2 | 11/2003 | Margrave et al. |
| 6,683,783 | B1 | 1/2004 | Smalley et al. |
| 6,686,311 | B2 | 2/2004 | Sun et al. |
| 6,692,717 | B1 | 2/2004 | Smalley et al. |
| 6,713,519 | B2 | 3/2004 | Wang et al. |
| 6,749,827 | B2 | 6/2004 | Smalley et al. |
| 6,761,870 | B1 | 7/2004 | Smalley et al. |
| 6,790,425 | B1 | 9/2004 | Smalley et al. |
| 6,800,369 | B2 | 10/2004 | Gimzewski et al. |
| 6,827,918 | B2 | 12/2004 | Margrave et al. |
| 6,827,919 | B1 | 12/2004 | Moy et al. |
| 6,835,330 | B2 | 12/2004 | Nishino et al. |
| 6,835,366 | B1 | 12/2004 | Margrave et al. |
| 6,841,139 | B2 | 1/2005 | Margrave et al. |
| 6,855,301 | B1 | 2/2005 | Rich et al. |
| 6,875,412 | B2 | 4/2005 | Margrave et al. |
| 6,890,986 | B2 | 5/2005 | Pruett |
| 6,899,945 | B2 | 5/2005 | Smalley et al. |
| 6,905,544 | B2 | 6/2005 | Setoguchi et al. |
| 6,913,740 | B2 | 7/2005 | Polverejan et al. |
| 6,913,789 | B2 | 7/2005 | Smalley et al. |
| 6,916,434 | B2 | 7/2005 | Nishino et al. |
| 6,919,064 | B2 | 7/2005 | Resasco et al. |
| 6,936,233 | B2 | 8/2005 | Smalley et al. |
| 6,949,237 | B2 | 9/2005 | Smalley et al. |
| 6,955,800 | B2 | 10/2005 | Resasco et al. |
| 6,960,389 | B2 | 11/2005 | Tennent et al. |
| 6,962,685 | B2 | 11/2005 | Sun |
| 6,979,709 | B2 | 12/2005 | Smalley et al. |
| 6,986,876 | B2 | 1/2006 | Smalley et al. |
| 6,998,358 | B2 | 2/2006 | French et al. |
| 7,011,771 | B2 | 3/2006 | Gao et al. |
| 7,041,620 | B2 | 5/2006 | Smalley et al. |
| 7,045,108 | B2 | 5/2006 | Jiang et al. |
| 7,048,999 | B2 | 5/2006 | Smalley et al. |
| 7,052,668 | B2 | 5/2006 | Smalley et al. |
| 7,067,098 | B2 | 6/2006 | Colbert et al. |
| 7,071,406 | B2 | 7/2006 | Smalley et al. |
| 7,074,379 | B2 | 7/2006 | Moy et al. |
| 7,094,385 | B2 | 8/2006 | Beguin et al. |
| 7,094,386 | B2 | 8/2006 | Resasco et al. |
| 7,094,679 | B1 | 8/2006 | Li et al. |
| 7,097,820 | B2 | 8/2006 | Colbert et al. |
| 7,105,596 | B2 | 9/2006 | Smalley et al. |
| 7,125,534 | B1 | 10/2006 | Smalley et al. |
| 7,132,062 | B1 | 11/2006 | Howard |
| 7,135,159 | B2 | 11/2006 | Shaffer et al. |
| 7,135,160 | B2 | 11/2006 | Yang et al. |
| 7,150,864 | B1 | 12/2006 | Smalley et al. |
| 7,157,068 | B2 | 1/2007 | Li et al. |
| 7,160,532 | B2 | 1/2007 | Liu et al. |
| 7,169,329 | B2 | 1/2007 | Wong et al. |
| 7,201,887 | B2 | 4/2007 | Smalley et al. |
| 7,204,970 | B2 | 4/2007 | Smalley et al. |
| 7,205,069 | B2 | 4/2007 | Smalley et al. |
| 7,214,360 | B2 | 5/2007 | Chen et al. |
| 7,250,148 | B2 | 7/2007 | Yang et al. |
| 7,270,795 | B2 | 9/2007 | Kawakami et al. |
| 7,291,318 | B2 | 11/2007 | Sakurabayashi et al. |
| 7,338,648 | B2 | 3/2008 | Harutyunyan et al. |
| 7,365,289 | B2 | 4/2008 | Wilkes et al. |
| 7,374,793 | B2 | 5/2008 | Furukawa et al. |
| 7,390,477 | B2 | 6/2008 | Smalley et al. |
| 7,396,798 | B2 | 7/2008 | Ma et al. |
| 7,408,186 | B2 | 8/2008 | Merkulov et al. |
| 7,410,628 | B2 | 8/2008 | Bening et al. |
| 7,413,723 | B2 | 8/2008 | Niu et al. |
| 7,452,828 | B2 | 11/2008 | Hirakata et al. |
| 7,459,137 | B2 | 12/2008 | Tour et al. |
| 7,459,138 | B2 | 12/2008 | Resasco et al. |
| 7,473,873 | B2 | 1/2009 | Biris et al. |
| 7,510,695 | B2 | 3/2009 | Smalley et al. |
| 7,527,780 | B2 | 5/2009 | Margrave et al. |
| 7,563,427 | B2 | 7/2009 | Wei et al. |
| 7,563,428 | B2 | 7/2009 | Resasco et al. |
| 7,569,203 | B2 | 8/2009 | Fridman et al. |
| 7,572,426 | B2 | 8/2009 | Strano et al. |
| 7,585,483 | B2 | 9/2009 | Edwin et al. |
| 7,601,322 | B2 | 10/2009 | Huang |
| 7,611,579 | B2 | 11/2009 | Lashmore et al. |
| 7,615,204 | B2 | 11/2009 | Ajayan et al. |
| 7,618,599 | B2 | 11/2009 | Kim et al. |
| 7,622,059 | B2 | 11/2009 | Bordere et al. |
| 7,632,569 | B2 | 12/2009 | Smalley et al. |
| 7,645,933 | B2 | 1/2010 | Narkis et al. |
| 7,655,302 | B2 | 2/2010 | Smalley et al. |
| 7,670,510 | B2 | 3/2010 | Wong et al. |
| 7,700,065 | B2 | 4/2010 | Fujioka et al. |
| 7,704,481 | B2 | 4/2010 | Higashi et al. |

(56) References Cited

U.S. PATENT DOCUMENTS

| | | | |
|---|---|---|---|
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,879,398 B2 | 2/2011 | Kim et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 8,486,362 B2 | 7/2013 | Fugetsu |
| 8,679,444 B2 | 3/2014 | Noyes |
| 8,865,613 B2 | 10/2014 | Mordkovich et al. |
| 9,090,472 B2 | 7/2015 | Noyes |
| 9,221,685 B2 | 12/2015 | Noyes |
| 9,327,970 B2 | 5/2016 | Nakamura et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0172767 A1 | 11/2002 | Grigorian et al. |
| 2002/0173420 A1 | 11/2002 | Cantrell et al. |
| 2003/0059364 A1 | 3/2003 | Prilutskiy |
| 2003/0147802 A1 | 8/2003 | Smalley et al. |
| 2004/0035355 A1 | 2/2004 | Avouris et al. |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0150312 A1 | 8/2004 | McElrath et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0220695 A1* | 10/2005 | Abatzoglou ........... B01J 23/755 423/445 R |
| 2005/0238810 A1 | 10/2005 | Scaringe et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0239891 A1 | 10/2006 | Niu et al. |
| 2006/0245996 A1 | 11/2006 | Xie et al. |
| 2006/0275956 A1 | 12/2006 | Konesky |
| 2006/0286022 A1 | 12/2006 | Miyamoto et al. |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0154382 A1* | 7/2007 | Edwin ................. B01J 4/002 423/447.3 |
| 2007/0172409 A1 | 7/2007 | Hikata |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0160312 A1 | 7/2008 | Furukawa et al. |
| 2008/0169061 A1 | 7/2008 | Tour et al. |
| 2008/0176069 A1 | 7/2008 | Ma et al. |
| 2008/0193367 A1 | 8/2008 | Kalck et al. |
| 2008/0217588 A1 | 9/2008 | Arnold et al. |
| 2008/0221227 A1 | 9/2008 | Christensen et al. |
| 2008/0226538 A1 | 9/2008 | Rumpf et al. |
| 2008/0233402 A1 | 9/2008 | Carlson et al. |
| 2008/0239620 A1 | 10/2008 | Min et al. |
| 2008/0260618 A1 | 10/2008 | Kawabata |
| 2008/0260628 A1* | 10/2008 | Moon ................. B01J 23/10 423/648.1 |
| 2008/0263954 A1 | 10/2008 | Hammel et al. |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0022652 A1 | 1/2009 | Sato et al. |
| 2009/0035569 A1 | 2/2009 | Gonzalez Moral et al. |
| 2009/0056802 A1 | 3/2009 | Rabani |
| 2009/0074634 A1 | 3/2009 | Tada et al. |
| 2009/0075157 A1 | 3/2009 | Pak et al. |

(56) References Cited

U.S. PATENT DOCUMENTS

| | | |
|---|---|---|
| 2009/0081454 A1 | 3/2009 | Axmann et al. |
| 2009/0087622 A1 | 4/2009 | Busnaina et al. |
| 2009/0124705 A1 | 5/2009 | Meyer et al. |
| 2009/0136413 A1 | 5/2009 | Li et al. |
| 2009/0140215 A1 | 6/2009 | Buchholz et al. |
| 2009/0176100 A1 | 7/2009 | Higashi et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0009204 A1 | 1/2010 | Noguchi et al. |
| 2010/0034725 A1 | 2/2010 | Harutyunyan |
| 2010/0047152 A1 | 2/2010 | Whelan et al. |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0104849 A1 | 4/2010 | Lashmore et al. |
| 2010/0129654 A1 | 5/2010 | Jiang et al. |
| 2010/0132883 A1 | 6/2010 | Burke et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0258446 A1 | 10/2010 | Mohapatra et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0303675 A1 | 12/2010 | Suekane et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0120138 A1 | 5/2011 | Gaiffi et al. |
| 2011/0142745 A1 | 6/2011 | Feng et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2011/0212016 A1 | 9/2011 | Lee et al. |
| 2012/0034150 A1* | 2/2012 | Noyes .................. B82Y 30/00 423/447.2 |
| 2012/0080313 A1 | 4/2012 | Baumgart et al. |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2012/0149824 A1 | 6/2012 | Hocke et al. |
| 2012/0258371 A1 | 10/2012 | Nakanishi et al. |
| 2013/0315813 A1 | 11/2013 | Chang et al. |
| 2014/0021827 A1 | 1/2014 | Noyes |
| 2014/0086820 A1 | 3/2014 | Nakamura et al. |
| 2014/0141248 A1 | 5/2014 | Noyes |
| 2014/0348739 A1 | 11/2014 | Denton et al. |
| 2015/0059527 A1 | 3/2015 | Noyes |
| 2015/0059571 A1 | 3/2015 | Denton et al. |
| 2015/0064092 A1 | 3/2015 | Noyes |
| 2015/0064096 A1 | 3/2015 | Noyes |
| 2015/0064097 A1 | 3/2015 | Noyes |
| 2015/0071848 A1 | 3/2015 | Denton et al. |
| 2015/0078981 A1 | 3/2015 | Noyes |
| 2015/0086468 A1 | 3/2015 | Noyes |
| 2015/0093323 A1 | 4/2015 | Koveal, Jr. et al. |
| 2015/0114819 A1 | 4/2015 | Denton et al. |
| 2015/0147259 A1 | 5/2015 | Noyes |
| 2015/0147261 A1 | 5/2015 | Denton et al. |
| 2015/0225242 A1 | 8/2015 | Noyes |
| 2015/0291424 A1 | 10/2015 | Noyes |
| 2015/0321918 A1 | 11/2015 | Noyes |
| 2016/0016794 A1 | 1/2016 | Noyes |
| 2016/0016800 A1 | 1/2016 | Noyes |
| 2016/0016862 A1 | 1/2016 | Noyes |
| 2016/0023902 A1 | 1/2016 | Noyes |
| 2016/0027934 A1 | 1/2016 | Noyes |
| 2016/0030925 A1 | 2/2016 | Noyes |
| 2016/0030926 A1 | 2/2016 | Noyes |
| 2016/0031710 A1 | 2/2016 | Noyes et al. |
| 2016/0039677 A1 | 2/2016 | Noyes |
| 2016/0156051 A1 | 6/2016 | Chua et al. |

FOREIGN PATENT DOCUMENTS

| | | |
|---|---|---|
| JP | 3339339 B2 | 10/2002 |
| JP | 2004360099 A | 12/2004 |
| JP | 2005272277 A | 10/2005 |
| WO | 0230816 A1 | 4/2002 |
| WO | 03018474 A1 | 3/2003 |
| WO | 2005103348 A1 | 11/2005 |
| WO | 2006003482 A2 | 1/2006 |
| WO | 2006130150 A2 | 12/2006 |
| WO | 2007126412 A2 | 11/2007 |
| WO | 2009122139 A1 | 10/2009 |
| WO | 2009145959 A1 | 12/2009 |
| WO | 2010087903 A1 | 8/2010 |
| WO | WO 2010/120581 * | 10/2010 |
| WO | 2010146169 A2 | 12/2010 |
| WO | 2011009071 A1 | 1/2011 |
| WO | 2014/150944 | 9/2014 |

OTHER PUBLICATIONS

Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

Baker, B. A. and G. D. Smith "Metal Dusting in a Laboratory Environment—Alloying Addition Effects," Special Metals corporation, undated.

Baker, B. A. and G. D. Smith, "Alloy Solutions to Metal Dusting Problems in the PetroChemical Industry," Special Metals Corporation, undated.

Database WPI Week 198920 Thomson Scientific, London, GB; AN 1989-148422 XP002719593, & JP H01 92425 A (Nippon Kokan KK) Apr. 11, 1989 (Apr. 11, 1989).

Cha, S. I., et al., "Mechanical and electrical properties of cross-linked carbon nanotubes," Carbon 46 (2008) 482-488, Elsevier, Ltd.

(56) References Cited

OTHER PUBLICATIONS

Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journai/1998/98_APL_72_3282-ChengH M.pdf).

Chun, Changmin, and Ramanarayanan, Trikur A., "Metal Dusting Corrosion of Metals and Alloys," 2007.

Chung, U.C., and W.S. Chung, "Mechanism on Growth of Carbon Nanotubes Using CO—H2 Gas Mixture," Materials Science Forum vols. 475-479 (2005) pp. 3551-3554.

Dai, et al., "Single-wall nanotubes produced by metal-catalyzed disproportionation of carbon monoxide," Chemical Physics Letters 260 (1996) 471-475, Elsevier.

Dresselhaus et al., Carbon Nanotubes Synthesis, Structure, Properties, and Applications. 2001, pp. 1-9, Springer.

Garmirian, James Edwin, "Carbon Deposition in a Bosch Process Using a Cobalt and Nickel Catalyst," PhD Dissertation, Massachusetts Institute of Technology, Mar. 1980, pp. 14-185.

Grobert, Nicole, "Carbon nanotubes—becoming clean," Materials Today, vol. 10, No. 1-2, Jan.-Feb. 2007, Elsevier, pp. 28-35.

Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan.

Hiraoka, Tatsuki, et al., "Synthesis of Single- and Double-Walled Carbon Nanotube Forests on Conducting Metal Foils," 9 J. Am. Chem. Soc. 2006, 128, 13338-13339.

Holmes, et al.; A Carbon Dioxide Reduction Unit Using Bosch Reaction and Expendable Catalyst Cartridges; NASA; 1970; available at https://archive.org/details/nasa_techdoc_19710002858.

Huang, Z.P., et al., "Growth of highly oriented carbon nanotubes by plasma-enhanced hot filament chemical vapor deposition," Applied Physics Letters 73:3845-3847, Dec. 28, 1998.

"INCONEL® alloy 693—Excellent Resistance to Metal Dusting and High Temperature Corrosion" Special Metals Product Sheet, 2005.

Unknown author, "Metal Dusting," unknown publisher, undated.

Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.

Lal, Archit, "Effect of Gas Composition and Carbon Activity on the Growth of Carbon Nanotubes," Masters Thesis, University of Florida, 2003.

Unknown author, "Metal Dusting of reducing gas furnace HK40 tube," unknown publisher, undated.

Manning, Michael Patrick, "An Investigation of the Bosch Process," PhD Dissertation, Massachusetts Institute of Technology, Jan. 1976.

Muller-Lorenz and Grabke, Coking by metal dusting of steels, 1999, Materials and Corrosion 50, 614-621 (1999).

Sae 820875, Sophonpanich et al., Utilization of Ruthenium and Ruthenium-Iron Alloys as Bosch Process Catalysts. Jul. 19-21, 1982, pp. 1-9.

Sae 911451, Bunnell et al., Optimization of Bosch Reaction, Jul. 15-18, 1991, pp. 253-259.

Nasibulin, Albert G., et al., "An essential role of C02 and H20 during single-walled CNT synthesis from carbon monoxide," Chemical Physics Letters 417 (2005) 179-184.

Nasibulin, Albert G., et al., "Correlation between catalyst particle and single-walled carbon nanotube diameters," Carbon 43 (2005) 2251-2257.

Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumina-nanofibers-and-composites).

Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.

Ruckenstein, E and H.Y. Wang, "Carbon Deposition and Catalytic Deactivation during C02 Reforming of CH4 over Co/?-Al2O3 Catalysts," Journal of Catalysis, vol. 205, Issue 2, Jan. 25, 2002, pp. 289-293.

Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.

Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii.Slides2.pdf, last visited Apr. 28, 2014.

Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj_files/2008/A0804251023348734.pdf).

Szakalos, P., "Mechanisms and driving forces of metal dusting," Materials and Corrosion, 2003, 54, No. 10, pp. 752-762.

Tsai, Heng-Yi, et al., "A feasibility study of preparing carbon nanotubes by using a metal dusting process," Diamond & Related Materials 18 (2009) 324-327, Elsevier.

Wilson, Richard B., "Fundamental Investigation of the Bosch Reaction," Master's Thesis, Massachusetts Institute of Technology, Sep. 1971, pp. 12, 23, 37, 43, 44, 62, 70, 80, 83-88, 98.

Wei, et al. "The mass production of carbon nanotubes using a nano-agglomerate fluidized bed reactor: A multiscale space-time analysis," Powder Technology 183 (2008) 10-20, Elsevier.

Zeng, Z., and Natesan, K., Relationship between the Growth of Carbon Nanofilaments and Metal Dusting Corrosion, 2005, Chem. Mater. 2005, 17, 3794-3801.

Camilli et al., The synthesis and characterization of carbon nanotubes grown by chemical vapor deposition using a stainless steel catalyst, Carbon, 2011, pp. 3307-3315, vol. 49, No. 10.

PCT International Written Opinion, PCT/US2014/024619, dated Jul. 24, 2014.

PCT International Preliminary Report on Patentability, PCT/US2014/024619, dated Sep. 15, 2015.

PCT International Search Report, PCT/US2014/024619, dated Jul. 24, 2014.

\* cited by examiner

METHODS OF PRODUCING HYDROGEN AND SOLID CARBON

PRIORITY CLAIM

This application claims the benefit of the filing date of U.S. Provisional Patent Application Ser. No. 61/794,278, filed Mar. 15, 2013, for "Hydrogen and Solid Carbon Production Method," the contents of which are incorporated herein by this reference.

FIELD

Embodiments of the disclosure relate to chemical processing, more specifically the processing of methane and water to produce hydrogen and solid carbon.

BACKGROUND

Additional information is disclosed in the following documents: International Patent Publication WO 2010/120581 A1, published Oct. 21, 2010, for "Method for Producing Solid Carbon by Reducing Carbon Oxides;" International Patent Publication WO 2013/158156, published Oct. 24, 2013, for "Methods and Structures for Reducing Carbon Oxides with Non-Ferrous Catalysts;" International Patent Publication WO 2013/158159, published Oct. 24, 2013, for "Methods and Systems for Thermal Energy Recovery from Production of Solid Carbon Materials by Reducing Carbon Oxides;" International Patent Publication WO 2013/158160, published Oct. 24, 2013, for "Methods for Producing Solid Carbon by Reducing Carbon Dioxide;" International Patent Publication WO 2013/158157, published Oct. 24, 2013, for "Methods and Reactors for Producing Solid Carbon Nanotubes, Solid Carbon Clusters, and Forests;" International Patent Publication WO 2013/158158, published Oct. 24, 2013, for "Methods for Treating an Offgas Containing Carbon Oxides;" International Patent Publication WO 2013/158155, published Oct. 24, 2013, for "Methods for Using Metal Catalysts in Carbon Oxide Catalytic Converters;" International Patent Publication WO 2013/158161, published Oct. 24, 2013, for "Methods and Systems for Capturing and Sequestering Carbon and for Reducing the Mass of Carbon Oxides in a Waste Gas Stream;" International Patent Publication WO 2014/011206, published Jan. 16, 2014, for "Methods and Systems for Forming Ammonia and Solid Carbon Products;" and International Patent Publication WO 2013/162650, published Oct. 31, 2013, "Carbon Nanotubes Having a Bimodal Size Distribution." The entire contents of each of these documents are incorporated herein by this reference.

Methane reforming is an economical process for commercial production of hydrogen. Hydrogen may be used in the industrial production of ammonia (e.g., using the Haber-Bosch process by reaction with nitrogen gas) and as a reducing agent for numerous chemical processes, among other uses. Two processes for methane reforming are widely employed: wet methane reforming and autothermal methane reforming.

Wet methane reforming uses water and a hydrocarbon (e.g., methane), to form hydrogen and carbon monoxide (syngas):

$$CH_4 + H_2O \rightleftharpoons CO + 3H_2 \quad (1).$$

Equation 1 is an endothermic reaction referred to in the art as the "steam-reforming" reaction. A catalyst (e.g., nickel) is typically used to promote the process. Temperatures of about 700° C. to about 1100° C. are commonly used.

A small amount of carbon dioxide is also typically formed, with additional hydrogen production:

$$CH_4 + 2H_2O \rightleftharpoons CO_2 + 4H_2 \quad (2).$$

At temperatures of about 130° C., as found near the outlets of smoke stacks, the carbon monoxide may further react with water:

$$CO + H_2O \rightleftharpoons CO_2 + H_2 \quad (3).$$

Equation 3 is commonly referred to as the "water-gas shift reaction."

Many apparatus, methods, and improvements thereto have been developed for wet methane reforming. Autothermal methane reforming uses oxygen and either carbon dioxide or water to form hydrogen and carbon monoxide:

$$2CH_4 + O_2 + CO_2 \rightleftharpoons 3H_2 + 3CO + H_2O \quad (4);$$

$$4CH_4 + O_2 + 2H_2O \rightleftharpoons 10H_2 + 4CO \quad (5).$$

An advantage of autothermal methane reforming over wet methane reforming is that the oxygen reacts with a portion of the methane in an exothermic reaction (combustion) and may provide heat to drive the reforming process. However, oxygen can also oxidize metal catalysts commonly used in these reactions, "poisoning" the catalyst and slowing further reactions.

In either process, most of the carbon oxides are typically oxidized to carbon dioxide, which then may either be released to the atmosphere, contributing to anthropogenic greenhouse-gas emissions, or separated from other gases and disposed of Separation of carbon oxides may involve pressure swing absorption (PSA), or other methods. Separated carbon oxides are increasingly being liquefied and may be captured, for example, by injection into oil or gas reservoirs, a costly process. Eliminating the need for separation of carbon oxides from hydrogen products of methane reforming would be of significant benefit to industry.

U.S. Pat. No. 7,794,690 (Abatzoglou et al.) teaches a dry reforming process for sequestration of carbon from an organic material. Abatzoglou discloses a process utilizing a two-dimensional (2-D) carbon sequestration catalyst with, optionally, a 3D dry reforming catalyst. For example, Abatzoglou discloses a two-stage process for dry reformation of an organic material (e.g., methane, ethanol) and $CO_2$ over a 3D catalyst to form syngas, in a first stage, followed by carbon sequestration of syngas over a 2D carbon steel catalyst to form CNTs and carbon nanofilaments. The 2D catalyst may be an active metal (e.g., Ni, Rh, Ru, Cu—Ni, Sn—Ni) on a nonporous metallic or ceramic support, or an iron-based catalyst (e.g., steel), on a monolith support. The 3D catalyst may be of similar composition, or may be a composite catalyst (e.g., Ni/$ZrO_2$—$Al_2O_3$) over a similar support. Abatzoglou teaches preactivation of a 2D catalyst by passing an inert gas stream over a surface of the catalyst at a temperature beyond its eutectic point, to transform the iron into its alpha phase. Abatzoglou teaches minimizing water in the two-stage process or introducing water in low concentrations (0 to 10 wt %) in a reactant gas mixture during the dry reformation first stage.

Various morphologies and allotropes of carbon are used industrially, such as for fuel, as reducing agents and electrodes in metallurgical processes, as corrosion-resistant materials in furnaces and heat exchangers, as carbon electrodes, as fillers and colorants in plastics, rubbers and inks, and as strengtheners in many polymer formulations including tires and hoses. High-purity carbon in many allotropes and morphologies is a bulk commodity chemical widely used in industry. Carbon nanotubes (CNTs) may be particularly valuable.

There is a spectrum of reactions involving carbon, oxygen, and hydrogen wherein various equilibria have been identified. Hydrocarbon pyrolysis involves equilibria between hydrogen and carbon that favors solid carbon production, typically with little or no oxygen present. The Boudouard reaction, also called the "carbon monoxide disproportionation reaction," is the range of equilibria between carbon and oxygen that favors solid carbon production, typically with little or no hydrogen present. The Bosch reaction is within a region of equilibria where all of carbon, oxygen, and hydrogen are present under reaction conditions that also favor solid carbon production.

Figure 1:
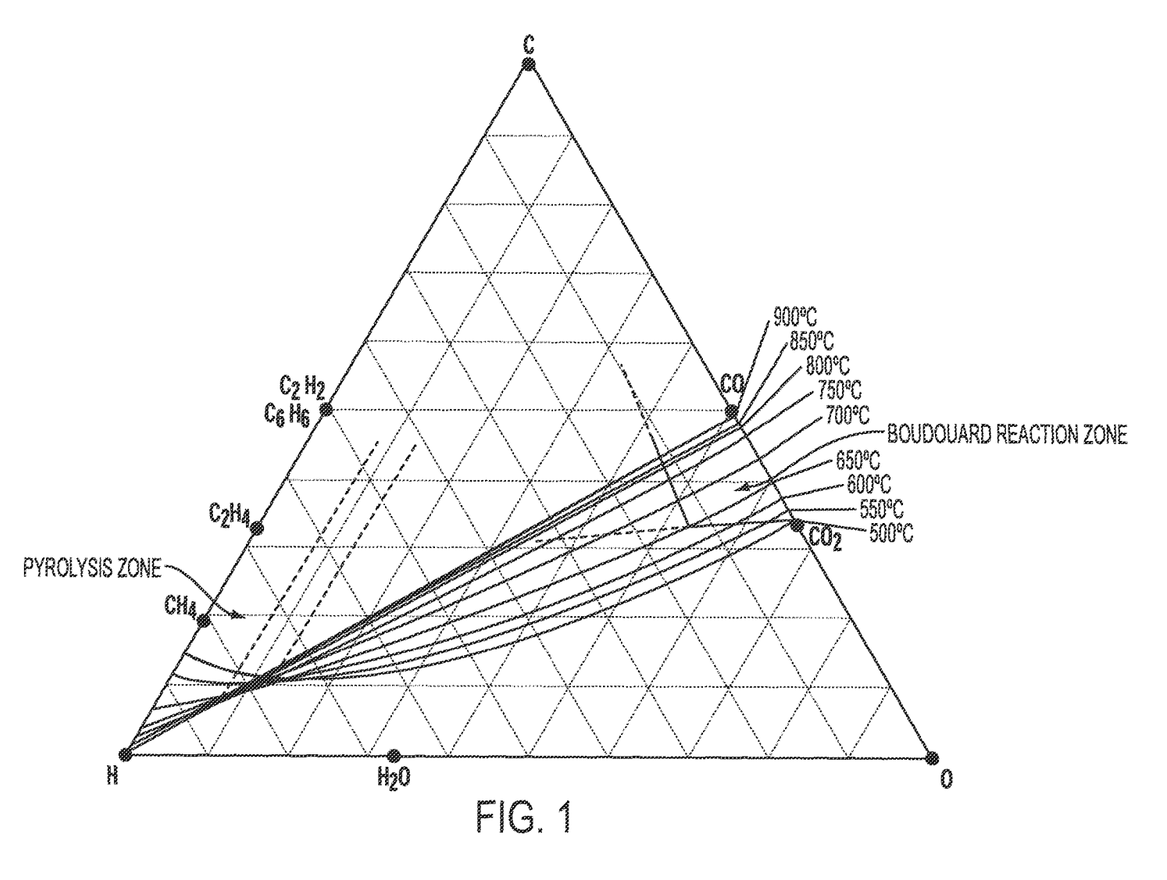
FIG. 1 depicts a C—H—O equilibrium diagram.

The relationship between the hydrocarbon pyrolysis, Boudouard, and Bosch reactions may be understood in terms of a C—H—O equilibrium diagram, as shown in FIG. 1. The C—H—O equilibrium diagram of FIG. 1 shows various known routes to solid carbon, including carbon nanotubes ("CNTs"). The hydrocarbon pyrolysis reactions occur on the equilibrium line that connects H and C and in the region near the left edge of the triangle to the upper left of the dashed lines. Two dashed lines are shown because the transition between the pyrolysis zone and the Bosch reaction zone may change with reactor temperature. The Boudouard, or carbon monoxide disproportionation reactions, occur near the equilibrium line that connects O and C (i.e., the right edge of the triangle). The equilibrium lines for various temperatures that traverse the diagram show the approximate regions in which solid carbon will form. For each temperature, solid carbon may form in the regions above the associated equilibrium line, but will not generally form in the regions below the equilibrium line. The Boudouard reaction zone appears at the right side of the triangle. In this zone, the Boudouard reaction is thermodynamically preferred over the Bosch reaction. In the region between the pyrolysis zone and the Boudouard reaction zone and above a particular reaction temperature curve, the Bosch reaction is thermodynamically preferred over the Boudouard reaction.

The use of carbon oxides as the carbon source in the production of solid carbon has largely been unexploited in methane reforming for the production of hydrogen as a way to use the carbon in the methane to produce a valuable co-product and as a way of minimizing the carbon oxides (principally carbon dioxide) typically emitted form methane reforming plants.

DISCLOSURE

In embodiments, methods are provided for methane reforming that reduce or eliminate the emission of carbon oxides to the atmosphere by converting the carbon in the carbon oxides to a solid carbon product.

In some embodiments, a two-stage process is disclosed comprising a methane reforming stage and a Bosch reaction stage. In the methane reforming stage, a process feed gas stream including methane and water reacts in the presence of a catalyst to form an intermediate gas stream including carbon oxides and hydrogen. In the Bosch reaction stage, carbon oxides in the intermediate gas stream react in the presence of a second catalyst to form solid carbon products and water. In certain embodiments, a two-stage process uses a first reaction zone and a second reaction zone. In some embodiments, a two-stage process uses two separate reactors.

In some embodiments, a process feed gas stream is heated before entering a first reaction zone containing a catalyst.

In some embodiments, one or more solid carbon products are removed from a second reaction zone of the two-stage process. In some embodiments, hydrogen is removed from a second reaction zone of the two-stage process.

In some embodiments, a tail gas stream is removed from a second reaction zone of the two-stage process.

In some embodiments, a tail gas stream may be recycled to form a portion of the process feed gas stream.

In some embodiments, at least a portion of the water in the tail gas stream is removed prior to recycling the tail gas stream to form a portion of the process feed gas stream.

In some embodiments, the tail gas stream is added to the intermediate gas stream from the first reactor where methane and water are reacted to form carbon oxides and hydrogen to form a portion of the feed gas stream to the second reactor where carbon oxides and hydrogen are reacted form solid carbon and water.

BRIEF DESCRIPTION OF THE DRAWINGS

Features and advantages of the disclosure will be apparent by reference to the following detailed description, taken in conjunction with the accompanying drawings, in which.

MODE(S) FOR CARRYING OUT THE INVENTION

Provided herein are methane reforming methods for producing hydrogen gas and solid carbon products. The methods utilize wet methane reforming or autothermal methane reforming reactions. Rather than separating the resulting carbon oxides and hydrogen (syngas) products of these reactions, a portion of the carbon oxides and hydrogen are further reacted to form solid carbon and water in the presence of a catalyst. The methods reduce capital, operating costs, and environmental costs of methane reforming, while producing an additional useful product in the form of solid carbon.

In some embodiments, a two-stage process for producing hydrogen and solid carbon includes a methane reforming stage and a Bosch reaction stage. In the methane reforming stage, a process feed gas stream including methane and water reacts to form an intermediate gas stream including carbon oxides and hydrogen. In the Bosch reaction stage, carbon oxides in the intermediate stream react to form solid carbon products and water. In some embodiments, a first, methane reforming stage occurs in a first reaction zone, and a second, Bosch reaction stage occurs in a second reaction zone. The result of this two stage reaction is to remove a portion of the carbon oxides from the reaction as solid carbon and water. The solid carbon becomes a valuable co-product of the hydrogen and the emission of carbon dioxide to the environment is reduced when compared to current practices of wet methane reforming.

As used herein, the term "carbon oxide" means and includes carbon monoxide, carbon dioxide, and mixtures of carbon monoxide, carbon dioxide, and optionally including one or more other materials (e.g., a reducing agent or nitrogen).

In certain embodiments, reaction kinetics favorable to improving the rate of one or both stages of a two-stage process may be established by suitable catalysts. As used herein, the term "catalyst" means and includes any material formulated to promote one or more reactions described herein. In some embodiments, a first reaction zone and a second reaction zone may each include a catalyst, which may be the same or different catalysts. Thus, in some embodiments, the same catalyst may be used to catalyze a methane reforming stage and a Bosch reaction stage of a two-stage process. In other embodiments, a catalyst used in a methane reforming stage may be different from a catalyst used in a Bosch reaction stage.

In some embodiments, a two-stage process may include a methane reforming stage. A process feed gas stream for use in a methane reforming reaction may include methane gas and steam. In some embodiments, a process feed gas contains a predetermined reaction gas composition, which is maintained in relatively constant proportions. In certain embodiments, a process feed gas stream is produced by forming a first feed gas stream containing methane; forming a second feed gas stream containing steam; and combining the first feed gas stream and the second gas stream to form a process feed gas stream. In certain embodiments, at least a portion of the steam is added (e.g., by injection or other methods) to the process feed gas stream after the process feed gas stream has entered a first reaction zone.

A process feed gas stream may be pretreated to remove unwanted gases, ions, and particulates. In embodiments, a methane or other hydrocarbon gas stream is pretreated before it is mixed with steam. In other embodiments, a process feed gas stream containing both methane or other hydrocarbon gas and steam is pretreated in a similar manner. Various methods for treating a gas stream are known in the art and are not described in detail herein (e.g., use of activated carbon filters to remove sulfur). In some embodiments, a purified methane gas stream may contain at least about 99% methane, before mixture with water. In some embodiments, a purified methane gas stream may contain at least about 99.9% methane, before mixture with water. Methods for removal of particulates and waste gases from a gas stream are disclosed herein.

Water for use in a methane reforming stage may be pretreated before it is heated to form steam. In embodiments, demineralization using an ion-exchange water conditioning system may be used to remove unwanted minerals in the water, reducing subsequent production of unwanted byproducts. Pure water may be formed as a co-product of some embodiments of the processes disclosed herein and at least a portion recycled to the methane reforming reaction.

Preheating of a process feed gas stream may facilitate more efficient reaction within a first reaction zone. In some embodiments, steam or liquid water is added to a process feed gas stream after a process feed gas stream has first been heated to a temperature above the boiling point of water at the pressure of the process feed gas stream, by injecting steam or water into the process feed gas stream. In some embodiments, preheating is facilitated by counterflowing at least a portion of the process feed gas stream with at least a portion of a heated tail gas stream. In other embodiments, at least a portion of a process feed gas stream is preheated by combustion of methane in the process feed gas stream. In certain embodiments, methane is combusted by adding oxygen gas to the process feed gas stream under conditions that favor combustion.

In some embodiments, reactant concentrations in a process feed gas stream is adjusted to be stoichiometric or near-stoichiometric. That is, the process feed gas stream may include concentrations of reactants (methane and steam) that, if fully reacted, would be almost entirely consumed. For example, the process feed gas stream may include about 50% methane and about 50% steam. This mixture, if fully reacted according to Equation 1, would consume approximately all of the gases in the process feed gas stream.

In some embodiments, any of reactions 1 through 5 may occur with an excess of some reactants. In certain embodiments, a predetermined reaction gas composition includes a stoichiometric excess of methane to water, favoring production of carbon monoxide that may then be used for subsequent reactions.

Temperatures of about 700° C. to about 1100° C. are commonly used in the first step of wet methane reforming (Equation 1). A first reaction zone is maintained at a predetermined temperature of about 800° C. to about 1000° C. In some embodiments, a first reaction zone is maintained at a predetermined temperature of at least about 850° C. In certain embodiments, a first reaction zone is maintained at a predetermined temperature of at least about 900° C., in the presence of a nickel catalyst.

In embodiments, the pressure in a first reaction zone is maintained at a predetermined pressure. In some embodiments, one or more reaction zones for a methane reforming stage are maintained at predetermined atmospheric pressures to about 30 MPa (4400 psia). In other embodiments, one or more reaction zones are maintained at predetermined pressures from about 0.69 MPa to about 6.95 MPa (about 100 psia to about 1000 psia).

Particularly useful catalysts for methane reforming reactions include nickel, iron, cobalt, etc., and alloys and mixtures thereof. In embodiments, an iron-based catalyst (i.e., iron, an iron alloy, or combinations thereof) is used to promote reactions within a methane reforming stage. In other embodiments, a nickel-based catalyst (nickel, a nickel alloy, or combinations thereof) is used. Commercial catalysts are also available, such as a Ni/MgAl$_2$O$_4$ catalyst, available from Unicat Catalysts, of Alvin, Tex., under the trade name NG-610-6H.

In some embodiments, the reducing agent introduced in the first reaction zone may be a reducing agent other than methane. Suitable alternative reducing agents include short chain hydrocarbons (e.g., ethane, propane, butane, pentane, and hexane), short chain alcohols (e.g., methanol, ethanol, butanol), hydrogen gas, and combinations and mixtures thereof.

In some embodiments, a two-stage process may include a Bosch reaction stage. The Bosch reaction uses hydrogen, hydrocarbons, alcohols, or mixtures thereof to reduce carbon oxides to solid carbon and water. For example, the Bosch reaction may use hydrogen as a suitable reducing agent:

$$CO_2 + 2H_2 \rightleftharpoons C_{(solid)} + H_2O \qquad (6)$$

The reaction is slightly exothermic (heat producing), with the release of approximately 24.9 kcal/mol at 650° C. (i.e., ΔH=−24.9 kcal/mol), when used to produce CNTs. The net enthalpy change in the Bosch reaction depends, in part, on what solid carbon product is formed. For example, the formation of graphite in this Bosch reaction releases approximately 23.8 kcal/mol at 650° C. The formation of C$_{60}$ fullerene in this Bosch reaction releases approximately 13.6 kcal/mol at 650° C. The formation of carbon lamp black in this Bosch reaction is endothermic, consuming approximately 147.5 kcal/mol at 650° C. (i.e., ΔH is +147.5 kcal/mol).

The Bosch reaction is reversible; in the reverse of the Bosch reaction, known as the water gas reaction, the solid carbon is oxidized by water to form carbon dioxide and hydrogen in an oxygen shift reaction commonly known as the water gas reaction. The water concentration in the reaction gases may be controlled to help obtain the purity and quality of solid carbon product desired. For example, because the Gibbs free energy of carbon nanotubes is lower than that of graphite and amorphous carbon, the water gas reaction will preferentially oxidize graphite and amorphous carbon leaving relatively pure CNTs.

The Bosch reaction of Equation 6 is believed to be a two-step reaction:

(7)

(8)

In the first step of the reaction (Equation 7), carbon dioxide reacts with hydrogen to form carbon monoxide and water in a "reverse water gas shift" reaction. The reaction is slightly endothermic, requiring a heat input of 8.47 kcal/mol (i.e., $\Delta H=+8.47$ kcal/mol) at 650° C. In the second step of the reaction (Equation 8), carbon monoxide reacts with hydrogen to form solid carbon and water, in an exothermic reaction releasing 33.4 kcal/mol ($1.16 \times 10^4$ joules/gram of $C_{(solid)}$) at 650° C., when CNTs are formed (i.e., $\Delta H=-33.4$ kcal/mol). Equation 8 may occur with stoichiometric amounts of reactants, or with excess $CO_2$ or $H_2$. Values of $\Delta H$ for Equation 8 may be calculated for other carbon products as the difference between the $\Delta H$ value for Equation 6 for that particular carbon product and the $\Delta H$ value for Equation 7.

The Bosch reaction may occur with stoichiometric amounts of reactants, or with an excess of either carbon dioxide or hydrogen. In embodiments, the composition of an intermediate gas stream entering a second reaction zone is regulated to maintain approximately stoichiometric amounts of reactants. In other embodiments, an excess of one reactant is used. In embodiments, the ratio of reactants available for the Bosch reaction is regulated by removing or adding one or both components to the intermediate gas stream entering the Bosch reaction stage, or directly to a second reaction zone, or by manipulating reaction conditions (e.g., temperature, catalyst, reactant concentration, pressure), in the preceding stage of the two-stage process.

Bosch reactions may proceed at temperatures from about 450° C. to over 2,000° C. The use of a ferrous or non-ferrous catalyst typically allows the Bosch reactions to proceed efficiently at lower temperatures. Bosch reactions may occur at temperatures in the range of approximately 400° C. to about 800° C. for ferrous catalysts, depending on the particle size and composition and the desired solid carbon product. In general, graphite and amorphous solid carbon form at lower temperatures, and CNTs form at higher temperatures above about 680° C. Although reaction temperatures above 680° C. may be used to produce solid carbon nanotubes, if the temperature is too high, the rate of the reverse reaction increases, and the equilibrium shifts to the left.

In embodiments, a second reaction zone for a Bosch reaction is maintained at a predetermined pressure. In general, the Bosch reactions proceed at a wide range of pressures, from near vacuum, to pressures of 4.0 MPa (580 psi) or higher. For example, CNTs may form in pressure ranges of from about 0.28 MPa (40 psi) to about 6.2 MPa (900 psi). In some embodiments, CNTs may form at pressures from about 0.34 MPa (50 psi) to about 0.41 MPa (60 psi), or at a pressure of about 4.1 MPa (600 psi). Typically, increasing the pressure increases the reaction rate.

In some embodiments, Bosch reactions for forming solid carbon may be accelerated using a catalyst from a group 8 element (e.g., iron) or a compound containing a group 8 element (e.g., iron carbide). Catalysts including mixtures of these elements may be formulated to yield a desired solid carbon morphology.

In embodiments, reaction kinetics favorable to the formation of the desired species of solid carbon may be established through the use of suitable catalysts. For example, in reactions forming CNTs, higher reaction rates may correspond to smaller diameter CNTs, and lower reaction rates may correspond to larger diameter CNTs. Suitable catalysts include metals selected from groups 2 through 15 of the periodic table, such as groups 5 through 10, (e.g., nickel, molybdenum, chromium, cobalt, tungsten, manganese, ruthenium, platinum, iridium, etc.), actinides, lanthanides, alloys thereof, combinations thereof, or compounds containing any such metals may accelerate the reaction rates of Equations 2, 3, and/or 4. Note that the periodic table may have various group numbering systems. As used herein, group 2 is the group including Be, group 3 is the group including Sc, group 4 is the group including Ti, group 5 is the group including V, group 6 is the group including Cr, group 7 is the group including Mn, group 8 is the group including Fe, group 9 is the group including Co, group 10 is the group including Ni, group 11 is the group including Cu, group 12 is the group including Zn, group 13 is the group including B, group 14 is the group including C, and group 15 is the group including N. Catalysts may facilitate operations at lower temperatures.

In some embodiments, a broad range of inexpensive and readily-available catalysts, including steel-based catalysts, may be used to catalyze the reactions disclosed herein. In certain embodiments, commercially available metals are used without special preparation. In certain embodiments, a steel-based catalyst is used in a reaction disclosed herein, without the need for activation of the catalyst before it is used. Iron alloys, including steel, may contain various allotropes of iron, including alpha-iron (austenite), gamma iron, and delta-iron. In some embodiments, reactions disclosed herein advantageously utilize an iron-based catalyst, wherein the iron is not in an alpha phase. In certain embodiments, a stainless steel containing iron primarily in the austenitic phase is used as a catalyst.

The use of commercial forms of commonly available metals may reduce the cost, complexity, and difficulty of producing solid carbon. For example, CNT forests may grow on commercial grades of steel, with the CNT forests forming directly on the steel without additional layers or surfaces isolating the steel from the CNT forest. CNTs form on materials such as on mild steel, 304 stainless steel, 316L stainless steel, steel wool, and 304 stainless steel wire.

304 stainless steel appears to catalyze the formation of CNTs under a wide range of temperatures, pressures, and gas compositions. However, the rate of formation of CNTs on 304 stainless steel appears to be relatively low, such that 304 stainless steel may be used effectively as a construction material for at least portions of the process equipment, with minimal deposition on surfaces thereof in normal operations. In most cases a metal alloy or inert material, known to resist metal dusting should be selected for the construction of the reactors and high temperature piping and heat exchangers where metal dusting may occur. 316L stainless steel, in contrast, appears to catalyze the formation of solid carbon at significantly higher rates than 304 stainless steel, but may also form various morphologies of carbon. Thus, 316L stainless steel may be used as a catalyst to achieve high reaction rates, but particular reaction conditions may be maintained to control product morphology. Catalysts may be selected to include Cr, such as in amounts of about 22% or less by weight. For example, 316L stainless steel contains from about 16% to about 18.5% Cr by weight. Catalysts may also be selected to include Ni, such as in amounts of about 8% or more by weight. For example, 316L stainless steel contains from about 10% to about 14% Ni by weight. Catalysts of these types of steel have iron in an austenitic phase, in contrast to alpha-phase iron used as a catalyst in conventional processes. Given the favorable results observed with 316L stainless steel, the Ni and/or Cr may have a synergistic effect with Fe.

The morphology of carbon nanotubes grown on steel is dependent on the chemistry of the steel and the way it was processed. In general, steels with smaller grain sizes tend to produce smaller diameter carbon nanotubes. The grain size is both a function of the chemistry of the steel and the heat treating methods under which the grains formed. Mild steels often produce a primary population of carbon nanotubes with diameters over 100 nm, while stainless steels (such as 304 or 316L) produce a primary population of carbon nanotubes with diameters in the range of 20 nm and under. This may be due to any of a number of factors not presently fully understood; however, it appears to be related to the grain size and boundary shapes within the metal, where the characteristic size of these features controls the characteristic diameter of the population of carbon nanotubes grown on the surface of such steel samples.

Catalysts for use in methods disclosed herein may be in the form of nanoparticles or in the form of domains or grains and grain boundaries within a solid material. Catalysts may be selected to have a grain size related to a characteristic dimension of a desired diameter of the solid carbon product (e.g. a CNT diameter). Catalyst powder may be formed in or near the reaction zone by injecting an aerosol solution such that upon evaporation of a carrier solvent, a selected particle size distribution results. Alternatively, powdered catalyst may be entrained in a carrier gas and delivered to the reactor. Catalysts may be formed as described in International Patent Publication WO 2010/120581 A1, previously incorporated by reference. By selecting the catalyst and the reaction conditions, the process may be tuned to produce selected morphologies of solid carbon.

In some embodiments, the catalyst may be formed over a substrate or support, such as an inert oxide that does not participate in the reactions. However, the substrate is not necessary; in other embodiments, the catalyst material is an unsupported material, such as a bulk metal or particles of metal not connected to another material (e.g., loose particles, shavings, or shot, such as may be used in a fluidized-bed reactor). Catalysts, including an iron-based catalyst (e.g., steel, steel wool), may be used without a need for an additional solid support. In certain embodiments, reactions disclosed herein proceed without the need for a ceramic or metallic support for the catalyst. Omitting a solid support may simplify the setup of the reactor and reduce costs.

In other embodiments, a non-ferrous catalyst may accelerate Bosch reactions. As used herein, the term "non-ferrous catalyst" means and includes a metal catalyst containing less than 1% iron or iron compounds. Thus, a non-ferrous catalyst includes catalyst materials in which iron is present in minor amounts or in which iron is absent. Minor amounts of iron may be present in some alloys. Catalysts formed from mixtures (e.g., alloys) of these materials may be designed to yield the desired solid carbon morphology.

A portion of a catalyst may be removed from a surrounding portion of the catalyst during the reaction and contained in or adhered to a solid carbon product. Thus, some of the catalyst may be physically removed during the reaction, and the catalyst may need to be continually replenished. The portion of the catalyst may not therefore be considered a catalyst in the classical sense, but is nonetheless referred to herein and in the art as a "catalyst," if the reaction is not believed to alter chemical bonds of the material forming the catalyst. Preparation and use of suitable catalysts is further disclosed in International Patent Publication WO 2013/158156, previously incorporated by reference.

Small amounts of substances such as sulfur added to a Bosch reaction may act as catalyst promoters that accelerate the growth of carbon products on the catalysts. In embodiments, promoters are introduced into a second reaction zone in a wide variety of compounds. Such compounds may be selected such that the decomposition temperature of the compound is below the reaction temperature. For example, if sulfur is selected as a promoter for an iron-based catalyst, the sulfur may be introduced into the second reaction zone as a thiophene gas, or as thiophene droplets in a carrier gas.

The solid carbon product of the Bosch reactions can form in a wide variety of allotropes and morphologies (e.g., graphite, graphene, carbon black, fibrous carbon, buckminsterfullerene, single-wall CNTs, multi-wall CNTs, platelets, nanodiamond, etc.), and mixtures thereof. The exact nature of the solid carbon product can be controlled through selection of the reaction gas mixture, temperature, pressure, and catalyst used to catalyze the solid carbon formation, as described in International Patent Publication WO 2010/120581 A1, previously incorporated by reference.

Without being bound to any particular theory, it is believed that carbon activity ($A_c$) may be a key indicator of whether solid carbon will form under particular reaction conditions (e.g., temperature, pressure, reactants, concentrations). Carbon activity for a reaction forming solid carbon from gaseous reactants can be defined as the reaction equilibrium constant times the partial pressure of gaseous products divided by the partial pressure of reactants. For example, in the reaction, $CO_{(g)} + H_{2(g)} \rightleftharpoons C_{(solid)} + H_2O_{(g)}$, with a reaction equilibrium constant of K, the carbon activity $A_c$ is defined as $K \cdot (P_{CO} \cdot P_{H2}/P_{H2O})$. Thus, $A_c$ is directly proportional to the partial pressures of CO and $H_2$, and inversely proportional to the partial pressure of $H_2O$. Higher $P_{H2O}$ tends to inhibit CNT formation. The carbon activity of this reaction may also be expressed in terms of mole fractions and total pressure: $A_c = K \cdot P_T (Y_{CO} \cdot Y_{H2}/Y_{H2O})$, where $P_T$ is the total pressure and Y is the mole fraction of a species. Carbon activity generally varies with temperature because reaction equilibrium constants vary generally with temperature. Carbon activity also varies with total pressure for reactions in which a different number of moles of gas are produced than are consumed. Higher carbon activity tends to result in the formation of CNTs; lower carbon activity tends to result in the formation of graphitic forms. Mixtures of solid carbon allotropes and morphologies thereof can thus be achieved by varying the catalyst and the carbon activity of the reaction gases in a second reaction zone.

Without being bound by any particular theory, carbon nanotubes appear to grow from a nucleating site that is the catalyzing particle. This catalyzing particle may be a domain in a piece of steel or steel wool, for example, or a discrete nanoparticle of iron in an aerosol or deposited on an inert substrate such as a quartz disk. The size of the carbon nanotube is generally proportional to the size of the nucleating site, with the ratio between the catalyst particle size and the CNT diameter observed to be about 1.3 to 1.6.

When using a solid catalyst, such as a wafer of steel, the carbon nanotubes appear to grow in a series of generations.

While the mechanism is not fully understood, it appears that the reaction gases interact with the exposed surface particles and the carbon nanotubes begin to grow, lifting the nucleating catalyst particles off of the surface of the bulk catalyst (i.e., as tip growth). As the growth continues, it appears that additional nucleation particles form on the surface of the bulk catalyst and, in turn, catalyze additional carbon nanotube growth, lifting the prior generation of carbon nanotubes off of the surface of the bulk catalyst.

In certain embodiments, hydrocarbon gases (e.g., methane, ethane, propane) may also be used in the Bosch reaction stage of a two-stage process described herein to provide both hydrogen and a portion of the carbon oxide to be reduced. A reducing gas mixture of one or more of the commonly available hydrocarbon gases such as lower hydrocarbon alkanes (e.g., methane, ethane, propane, butane, pentane, and hexane), including those found in natural gas, may be an economical choice in some applications.

In some embodiments, the reducing gas for use in a Bosch reaction may include methane because methane may be used as both a reducing agent and as a carbon source. Thus, unreacted methane and other hydrocarbon gases from a first reaction stage, may further react in a second reaction stage of a two-stage process, according to the Bosch reactions.

In some embodiments, it may also be practical to associate the two-stage process with a production facility (e.g., power plant, coal facility, or cement calciner), to provide a potential source for both a hydrocarbon fuel source and for carbon oxides that are found, for example, in an offgas from the facility.

A wide variety of reactor designs may be used to facilitate a two-stage process. The term "reaction zone," as used herein, may refer to any physical area in which a particular reaction or set of reactions is designed to take place. A single reactor vessel may include two or more separate reaction chambers functioning as a first and second reaction zone, respectively. The chambers may be separated from one another by means of baffles, separating walls, or other such means known in the art. In other embodiments, two or more reactor vessels may function as a first and second reaction zone for a two-stage process described herein. Thus, in some embodiments, a first reactor vessel is coextensive with a first reaction zone, and a second reactor vessel is coextensive with a second reaction zone. Additional chambers or additional vessels may be used for separation, filtering, condensation, and addition of various substances (catalysts, additional reactants, etc.).

Typically, some or all of a methane reforming stage or first stage of a two-stage process will take place in a first reaction zone. Similarly, some or all of a Bosch reaction stage or second stage of a two-stage process will typically take place in a second reaction zone. The reactions associated with the two stage process are not mutually exclusive; depending on temperature and other reaction conditions, and in various embodiments, one or both stages of a two-stage process, in addition to optional side-reactions, may occur in one or more reaction zones. Additionally, the designation of a "first reaction zone" and a "second reaction zone" is not to be construed as limiting on the physical location of the reactions described herein, but rather describes the relative order in time in which the stages of a two-stage process typically are to occur. Various configurations, including those in which the products of one stage are recycled to serve as the reactants for another stage, are embodied within the methods.

Aerosol and fluidized bed reactors are particularly suitable for high volume continuous production of a solid carbon product. A fluid wall reactor has the advantages of providing for the introduction of various substances (e.g., catalysts, additional reactants) and of minimizing or eliminating the accumulation of solid carbon products on the reactor wall. In embodiments, a fluidized bed reactor is designed to retain the catalyst while allowing CNTs to be entrained in the gas flow and to be lofted out of the reaction zone upon reaching a desired size, the lofting due to the drag forces on the forming particles. This control may be achieved by controlling the shape of the reactor, the gas flow rates, or shape and flow rates in combination, and may allow control over the residence time of the elutriates and the corresponding size of the solid carbon product (such as the length of the carbon nanotubes).

In aerosol or fluidized bed reactors, the residence time in the growth zone may be controlled by a number of forces (such as gravitational, electromagnetic, or centrifugal forces) counteracting the motion of the gas stream. These forces counterbalance the gas flow to help control the residence time, so that the size of the solid carbon product may be controlled. By way of example only, other suitable reactor designs that may be used in certain embodiments may include packed-bed reactors (PBR) and membrane reactors (MR).

Additional reactor and catalyst designs suitable for particular embodiments are disclosed in International Patent Publication WO 2013/158158, previously incorporated by reference.

First and second reaction zones may be maintained at various temperatures. In embodiments, the first reaction zone is maintained at a different temperature from the second reaction zone. In embodiments, first or second reaction zones may be maintained at predetermined temperatures.

The first and second reaction zones may be maintained at various pressures. In embodiments, the first reaction zone is maintained at a different pressure from the second reaction zone. In embodiments, the first or second reaction zones may be maintained at predetermined pressures.

A reactor may be coupled with heating and cooling mechanisms to control the temperature of the reactor. For example, a reactor may be configured such that products and excess reactant are recycled through a cooling mechanism to condense water vapor. The products and/or excess reactant may then be reheated and recycled through the reactor. By removing some of the water vapor in the recycled gases, the morphology of solid carbon formed may be controlled. Changing the partial pressure of water vapor changes the carbon activity of a mixture. The reactor may also be coupled to a carbon collector in which water and unreacted reactants are separated from the carbon products. The separated carbon products are collected and removed from the system.

Since methane-reforming reactions typically occur at higher temperatures than Bosch reactions, it may be desirable to add a cooler carbon oxide stream to gases flowing from methane-reforming reactions to cool the resulting mixed gas stream to a temperature suitable for subsequent Bosch reactions. In embodiments, a separate cooling chamber may allow the temperature of an intermediate gas stream leaving a methane reformer stage to cool before the intermediate gas stream reacts in a subsequent Bosch reaction stage. In some embodiments, a condenser unit is used to cool an intermediate gas stream and to remove water. In such embodiments, the intermediate gas stream may additionally be reheated to optimal temperatures for a subsequent Bosch reaction stage.

In the presence of oxygen, hydrocarbons may react to form carbon monoxide, carbon dioxide and water, as well as small hydrocarbons and hydrogen. These combustion reactions may be useful in a methane reformer to provide some or all of the thermal energy needed to drive the endothermic step of the process. High concentrations of oxygen may result in producing less solid carbon in a Bosch reaction, however. Therefore, it may be desired to restrict the amount of oxygen present in the Bosch reaction stage of a two-stage process described herein to optimize the production of solid carbon. Additionally, the presence of oxygen may be a source of catalyst poisoning and reduce the activity of a metal catalyst.

In some embodiments, methods for removal of oxygen at various stages of a two-stage reaction process are employed. In certain embodiments, oxygen may be desired in a first stage of a two-stage process, to facilitate combustion of methane gases, then some or all of the residual oxygen may be removed from the first reaction zone and/or from the intermediate gas stream. In some embodiments, a first catalyst for use in a methane reforming reaction is selected which is less disposed to oxidation in the presence of oxygen gas.

In some embodiments, a portion of the hydrogen gas produced in a methane reformer stage of a two-stage reaction process is purified from one or more reaction zones by various methods known in the art, including pressure swing absorption (PSA). Separation of part of the hydrogen in the reactor may allow the operator to maintain a desired stoichiometric balance for subsequent reaction with carbon oxides, for example, in the Bosch reaction, and it may be desirable to retain a portion of the hydrogen as an end product. Hydrogen may also be separated from a tail gas stream following a Bosch reaction stage of a two-stage process.

In certain embodiments, a solid carbon product is separated from one or more reaction zones. In some embodiments, separation of the solid carbon product may occur while the reaction proceeds. In some embodiments, solid carbon is separated while it is suspended in a gas stream. In other embodiments, solid carbon is separated while it is bound or settled on a catalyst surface. The separation of the solid carbon product from a gas stream and the catalyst depends on the type of reactor used. For example, the solid carbon may be harvested directly from the gas stream in an aerosol reactor or the elutriates from a fluidized bed reactor, using electrophoretic or thermophoretic collectors or various filtration methods. In some embodiments, a cyclone separator or a baghouse type filter is used to separate and collect a solid carbon product. For a solid catalyst or solid surface mounted catalyst, the solid carbon product may be scraped or otherwise abraded from the surface of the solid carrier material. Alternatively, the solid carbon product may be rinsed off of the surface of the catalyst with a solvent. Various strategies for removing solid carbon products from a reactor vessel are further disclosed in U.S. Provisional Application 61/624,702.

Gaseous mixtures at various stages of a two-stage process may contain small amounts of unwanted gases and/or particulate matter. Various waste gases may be present, including $SO_x$, $NO_x$, $N_2$, $H_2S$, and acids (e.g., hydrochloric acid and sulfuric acid) depending on the source and purity of the process feed gas and the reaction conditions. In some embodiments, waste gases are removed from a process feed gas stream, from one or more intermediate gas streams, or from a tail gas stream. In other embodiments, a gas separator is associated with either a first or second reaction zone to process one or more waste gases directly. In some embodiments, oxygen may also be considered a waste gas, as discussed herein, and is removed at various stages of the two-stage process, using methods known in the art.

Numerous methods and equipment for removing particulates from a gas mixture are known in the art, including the use of mechanical collectors, electrical precipitators, scrubbers, and fabric filters (bag houses). Contaminants such as sulfur and phosphorus, and compounds thereof, may act as catalyst poisons, and may be removed using methods known in the art. In some embodiments, a system for a two-stage process includes equipment for removing particulates from a process feed gas stream, an intermediate gas stream, a tail gas stream, or a gas mixture found within a first or second reaction zone. In some embodiments, particulates are removed from a process feed gas stream before the process feed gas stream enters a first reaction zone.

Water may be removed from one or more stages of a two-stage process. In some embodiments, an intermediate stream is cooled to condense water vapor and the latent heat extracted for heating purposes, or as part of a low-pressure power-extraction cycle. Condensed water may then be removed using methods known in the art. The water may be treated to remove dissolved reaction gases, filtered to remove solid contaminants, and/or released the environment. In general, pure water may be formed as a co-product.

A tail gas stream herein may include steam, unreacted methane, carbon oxides, hydrogen, various waste gases, and/or aerosolized solid carbon products. Alternatively, a tail gas stream may contain primarily or entirely steam. In some embodiments, a portion of the steam is removed from a tail gas stream by methods known in the art, for example a heat exchanger may be used to condense a portion of the water from the tail gas stream.

A tail gas stream is recycled to constitute a portion of a process feed gas stream. In some embodiments, a portion of the tail gas stream is passed back directly into a first or second reaction zone to continue the reactions occurring there. In other embodiments, a portion of the tail gas stream is recycled and mixed with either the process feed gas stream or the intermediate gas stream to continue the reactions.

Figure 2:
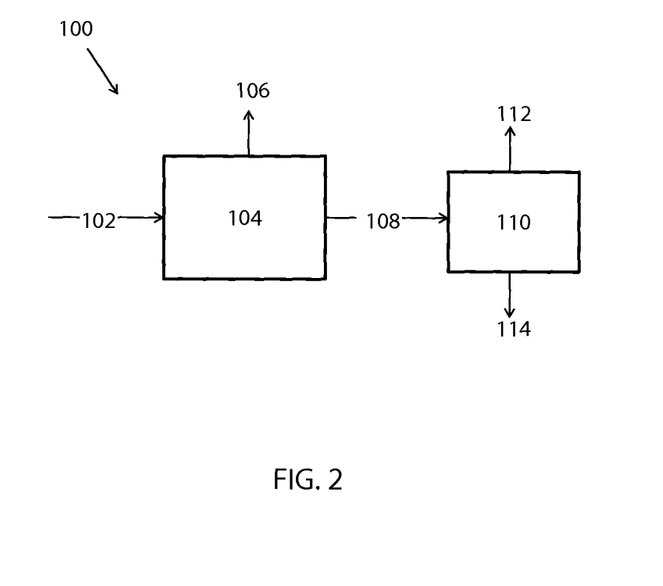
FIGS. 2 and 3 illustrate simplified process flow diagrams indicating how processes of the current disclosure may be performed.

FIG. 2 shows one embodiment of a system 100 that may be used according to methods disclosed herein. In the system 100, a process feed gas stream 102 including methane and steam enters a first reaction zone 104 comprising a methane reformer maintained at approximately 900° C. or greater and containing a first catalyst.

The methane and steam undergo reaction in the first reaction zone 104, producing a mixture that may include carbon oxides, hydrogen, waste gases, and unreacted methane and steam. In some embodiments, the methane may react substantially to completion in a first reaction zone. A hydrogen gas stream 106 is separated from a first reaction zone 104 using means known in the art. Separation of a portion of the hydrogen gas from a first reaction zone may allow the operator to maintain a desired stoichiometric balance of hydrogen to carbon oxides for use in a Bosch reaction.

In the system 100, an intermediate gas stream 108 flows from the first reaction zone 104 and passes into a second reaction zone 110, comprising a Bosch reactor, maintained at about at least 680° C., and containing a second catalyst. Products formed inside the second reaction zone 110 may include solid carbon, steam, unreacted carbon oxides, hydrogen, methane, waste gases, and particulates. Hydrogen 112 and solid carbon 114 are removed from the second reaction zone 110.

The first reaction zone 104 and the second reaction zone 110 may include means for material handling, mixing, controlling temperature, controlling pressure, adding and removing reactants and products, etc. The first reaction zone 104 and the second reaction zone 110 may include one or more sensors, controllers, etc., and the conditions in the first reaction zone 104 and the second reaction zone 110 may remain constant or may vary during processing. For example, controllers may be configured to maintain selected conditions, as indicated by signals received from the one or more sensors.

Figure 3:
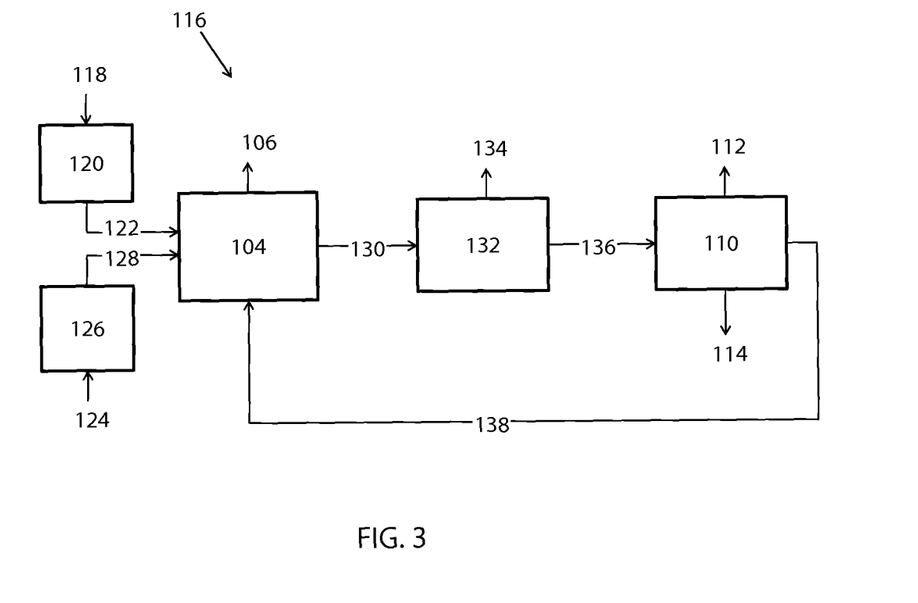

FIG. 3 shows an additional embodiment of a system 116 that may be used according to methods disclosed herein. In the system 116, methane gas 118 flows through a first purifier unit 120 to remove unwanted gases and particulates, leaving a purified methane gas stream 122. Water 124 flows through a second purifier unit 126 in which unwanted minerals and impurities are removed, and in which the water is heated to form steam, leaving purified steam 128.

A purified methane gas stream 122 and purified steam 128 flow into a first reaction zone 104 comprising a methane reformer, maintained at about at least 900° C. and containing a first catalyst. The purified methane gas stream 122 and purified steam 128 react in the first reaction zone 104 to produce a mixture that may include carbon oxides, hydrogen and unreacted methane and steam. In some embodiments, a purified methane gas stream 122 may react substantially to completion in a first reaction zone 104. In other embodiments, residual methane gas may remain in the first reaction zone 104. A hydrogen gas stream 106 may be separated from a first reaction zone 104 using means known in the art. Separation of a portion of the hydrogen gas from a first reaction zone 104 may allow the operator to maintain a desired stoichiometric balance of hydrogen to carbon oxides for use in a Bosch reaction that occurs in the second reaction zone 110.

In the system 116, a first intermediate gas stream 130 flows from the first reaction zone 104 and passes through a condenser unit 132. This condenser unit 132 may include heat exchangers to cool the intermediate gas stream 130 and recover at least a portion of the heat to any or all of the methane gas 118, water 124, or tail gas stream 138. The condenser unit 132 may also include equipment to remove at least a portion of the water in the tail gas stream 138. Water 134 is condensed and removed from the condenser unit 132. A second intermediate gas stream 136 flows into a second reaction zone 110 comprising a Bosch reactor maintained at about at least 500° C., containing a second catalyst. Products formed inside the second reaction zone 110 may include solid carbon, steam, unreacted hydrogen gas, carbon oxides, methane, waste gases, and particulates. Hydrogen 112 and solid carbon 114 are removed from the second reaction zone 110. At least a portion of the water in the intermediate gas stream 136 may also be removed in the second reaction zone 110.

In the system 116, a tail gas stream 138 containing residual methane, steam, carbon oxides, hydrogen, and waste gases are recycled to further react in the first reaction zone 104. Optionally, all or a portion of the tail gas stream 138 may be recycled to form at least a portion of the intermediate gas stream 136.

The first reaction zone 104 and the second reaction zone 110 may include means for material handling, mixing, controlling temperature, controlling pressure, adding and removing reactants and products, etc. The first reaction zone 104 and the second reaction zone 110 may include one or more sensors, controllers, etc., and the conditions in the first reaction zone 104 and the second reaction zone 110 may remain constant or may vary during processing. For example, controllers may be configured to maintain selected conditions such as reaction temperature, reaction pressure, catalyst level and reaction gas mixtures, as indicated by signals received from the sensors.

What is claimed is:

1. A method for producing hydrogen, the method comprising:
   heating a feed gas comprising methane and steam;
   flowing the feed gas into a first reaction zone containing a first catalyst, wherein at least a portion of the feed gas is converted into hydrogen, wherein the hydrogen forms a part of a first intermediate gas;
   separating a portion of the hydrogen from the first intermediate gas to form a second intermediate gas;
   flowing the second intermediate gas into a second reaction zone containing a second catalyst, wherein at least a portion of the second intermediate gas is converted into solid carbon and water;
   removing the solid carbon from the second reaction zone;
   removing a tail gas from the second reaction zone, the tail gas comprising hydrogen; and
   removing hydrogen from the tail gas to form a hydrogen gas stream and a hydrogen-depleted tail gas stream.

2. The method according to claim 1, wherein the second intermediate gas comprises carbon oxides and hydrogen.

3. The method according to claim 1, further comprising recycling the hydrogen-depleted tail gas to the first reaction zone.

4. The method according to claim 1, wherein heating the feed gas comprises counter flowing through at least one heat exchanger at least one of at least a portion of the feed gas with at least one of at least a portion of the tail gas and at least a portion of the hydrogen-depleted tail gas for heat recovery.

5. The method according to claim 1, wherein heating the feed gas comprises combustion of a portion of the methane in the feed gas.

6. The method according to claim 5, wherein combustion of a portion of the methane in the feed gas comprises adding oxygen to the feed gas under conditions in which only a portion of the methane will combust with the oxygen.

7. The method according to claim 1, wherein at least a portion of the steam in the feed gas is formed by combustion of at least a portion of the methane in the feed gas.

8. The method according to claim 1, further comprising:
   forming a first feed gas comprising methane;
   forming a second feed gas comprising steam; and,
   combining the first feed gas and the second feed gas to form a feed gas comprising methane and steam.

9. The method according to claim 1, further comprising:
   forming a first feed gas comprising methane;
   forming a second feed gas comprising steam;
   recycling at least a portion of the tail gas; and
   combining the first feed gas, the second feed gas, and the portion of the tail gas to form a feed gas comprising methane and steam.

10. The method according to claim 1, wherein at least one of the first catalyst and the second catalyst comprises steel.

11. The method according to claim 1, further comprising maintaining at least one of the first reaction zone and the second reaction zone at a pressure between about 0 MPa and about 30 MPa.

12. The method according to claim 1, further comprising maintaining the temperature of at least one of the first reaction zone and the second reaction zone at a temperature between approximately 500° C. and approximately 1500° C.

13. The method according to claim 1, wherein:
at least a portion of the methane and at least a portion of the water react in the first reaction zone to produce carbon monoxide, carbon dioxide, and hydrogen in the presence of the first catalyst;
flowing the second intermediate gas into a second reaction zone comprises flowing at least a portion of the carbon monoxide, at least a portion of the carbon dioxide, and at least a portion of the hydrogen produced in the first reaction zone to the second reaction zone; and
at least a portion of the carbon monoxide, carbon dioxide, and hydrogen in the second reaction zone react to form solid carbon and water in the presence of the second catalyst.

14. The method according to claim 1, further comprising removing at least a portion of the water from at least one of the tail gas and the hydrogen-depleted tail gas.

15. The method according to claim 14, further comprising recycling at least a portion of the water to constitute at least a portion of the steam in the feed gas.

16. The method according to claim 1, further comprising injecting water or steam into the first reaction zone to supplement at least a portion of the steam in the feed gas.

17. The method according to claim 1, further comprising:
heating the feed gas to a temperature above the boiling point of water at the pressure of the feed gas; and
injecting steam or water into the feed gas to form at least a portion of the steam in the feed gas.

18. The method according to claim 1, further comprising:
condensing water vapor from the second intermediate gas before flowing the second intermediate gas into the second reaction zone; and
removing water from the second intermediate gas.

19. The method according to claim 1, wherein at least one of the first catalyst and the second catalyst comprises an unsupported iron-based catalyst comprising iron not in the alpha phase.

* * * * *

UNITED STATES PATENT AND TRADEMARK OFFICE
CERTIFICATE OF CORRECTION

PATENT NO. : 9,783,416 B2
APPLICATION NO. : 14/775946
DATED : October 10, 2017
INVENTOR(S) : Dallas B. Noyes Page 1 of 1

It is certified that error appears in the above-identified patent and that said Letters Patent is hereby corrected as shown below:

In the Specification
Column 5, Line 56, change "by counterfiowing at" to --by counterflowing at--

Signed and Sealed this
Twenty-second Day of May, 2018

Andrei Iancu
*Director of the United States Patent and Trademark Office*